March 3, 1970     T. H. ATKINS     3,498,211

PRODUCT AND WASTE DISPOSAL CARRIER FOR BARBECUE OVENS

Filed April 1, 1968     2 Sheets-Sheet 1

INVENTOR.
TEMPLE H. ATKINS

BY John H. Widdowson
Phillip A. Zein
ATTORNEYS

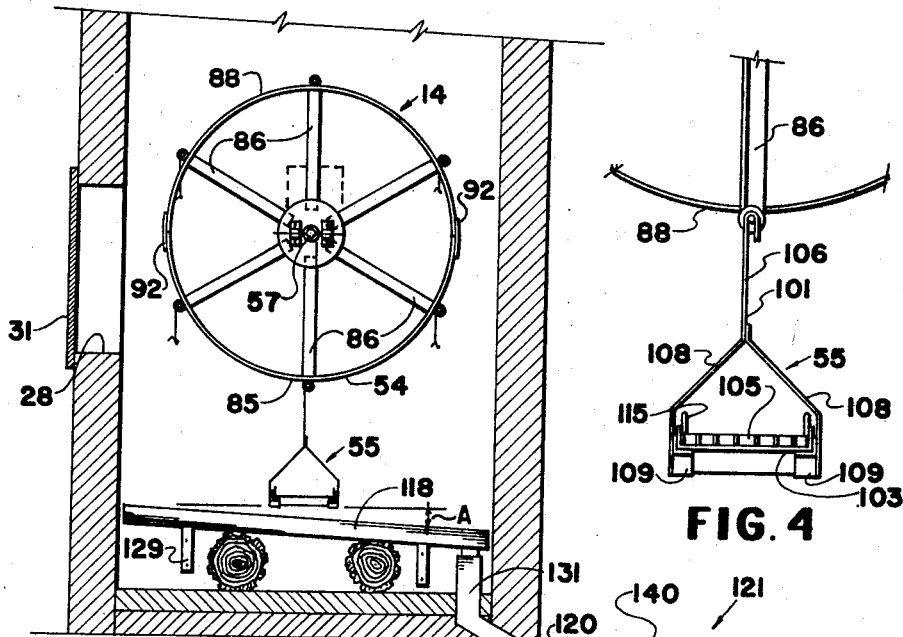
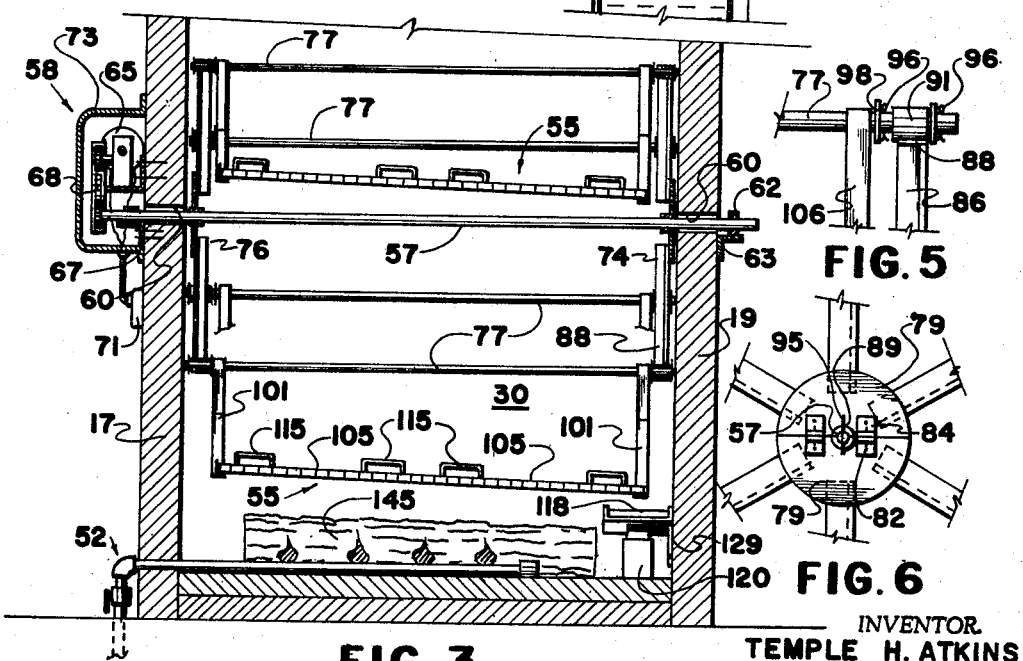

United States Patent Office 3,498,211
Patented Mar. 3, 1970

3,498,211
PRODUCT AND WASTE DISPOSAL CARRIER
FOR BARBECUE OVENS
Temple H. Atkins, 2420 S. Oliver,
Wichita, Kans. 67210
Filed Apr. 1, 1968, Ser. No. 717,565
Int. Cl. A47j 37/04
U.S. Cl. 99—443                               5 Claims

ABSTRACT OF THE DISCLOSURE

This invention relates to a rotatable product carrier mountable in cooking ovens for barbecuing, roasting, broiling, and the like, but preferably, for barbecuing operations. More particularly, this invention relates to a cage-type product and waste disposal carrier mountable within a cooking oven including a plurality of spaced, downwardly depending tray assemblies thereon rotatable about a central axis adapted to convey meat juices and the like therefrom to a common collecting tray for conveyance externally of the cooking oven. Still, more particularly, this invention relates to a cooking oven having a rotatable product carrier therein provided with a plurality of inclined basket assemblies mounted for rotation about a common axis and means for controlling the air flow in the oven in order to maintain a basking and smoking type atmosphere for the barbecuing of various meats as desired.

---

Numerous types of barbecuing ovens are known to the prior art in which a plurality of various elevated shelves are provided to support meats thereon for cooking in the oven as by the use of an enclosed heat and smoke. However, the prior art devices are unsatisfactory in that the juices from the meats being cooked are allowed to drip onto the other meat products carried within and, additionally, permitting the heated wastes to fall on the cooking medium, namely charcoal or hickory logs, which tends to extinguish the same or may ignite presenting a fire hazard. Additionally, the prior art barbecue ovens do not operate to keep the meat product therein receiving equal amounts of heat during the cooking operation which is very desirable so that the product is progressively done therein depending only upon the length of time to which it has been placed in the oven. The prior art barbecue ovens are generally difficult to clean, present fire hazards, and are not uniform in operation.

An object of this invention is to provide a new and improved barbecue oven having a rotatable product and waste disposal carrier therein overcoming the above-mentioned disadvantages of the prior art devices.

A further object of this invention is to provide a cooking apparatus mountable within a barbecue oven having a rotatable product carrier adapted to carry products being cooked about the oven and having a collecting means associated therewith adapted to carry the meat juices and the like from the barbecue oven to a remote location for hygienic plus safety reasons.

One other object of this invention is to provide a cooking apparatus having a rotatable product carrier provided with a plurality of horizontally extended support bars rotatable about a common drive shaft and having a plurality of downwardly depending basket assemblies mounted thereon adapted to receive the product to be cooked for movement about the drive shaft.

One further object of this invention is to provide a rotatable product and waste disposal carrier including basket assemblies having elongated support frames with lower trays therein inclined downwardly to receive a basket for carrying the meat product to be cooked for ease of handling whereupon the fluid from the cooking meat is carried by the trays downwardly for eventual discharge from the cooking oven.

A still further object of this invention is to provide a product carrier that is easily assembled and disassembled for construction within existing barbecue ovens, economical to manufacture, dependable and efficient in operation, and easy to use.

Various other objects, advantages, and features of the invention over the prior art devices will become obvious to one skilled in the art, taken in conjunction with the accompanying drawings in which:

FIG. 2 is a fragmentary elevational view of the cooking oven revealing the product and waste disposal carrier of this invention;

FIG. 3 is a fragmentary front elevational view inside the front wall of the cooking oven to reveal the product and waste disposal carrier of this invention;

FIG. 4 is a fragmentary enlarged view of a portion of the rotatable product carrier of this invention;

FIG. 5 is a fragmentary enlarged view showing the connecting means of attaching a rotatable basket means of the product carrier of this invention; and FIG. 6 is an enlarged fragmentary sectional view showing the connecting of one central hub portion of the product carrier of this invention.

Figure 1:
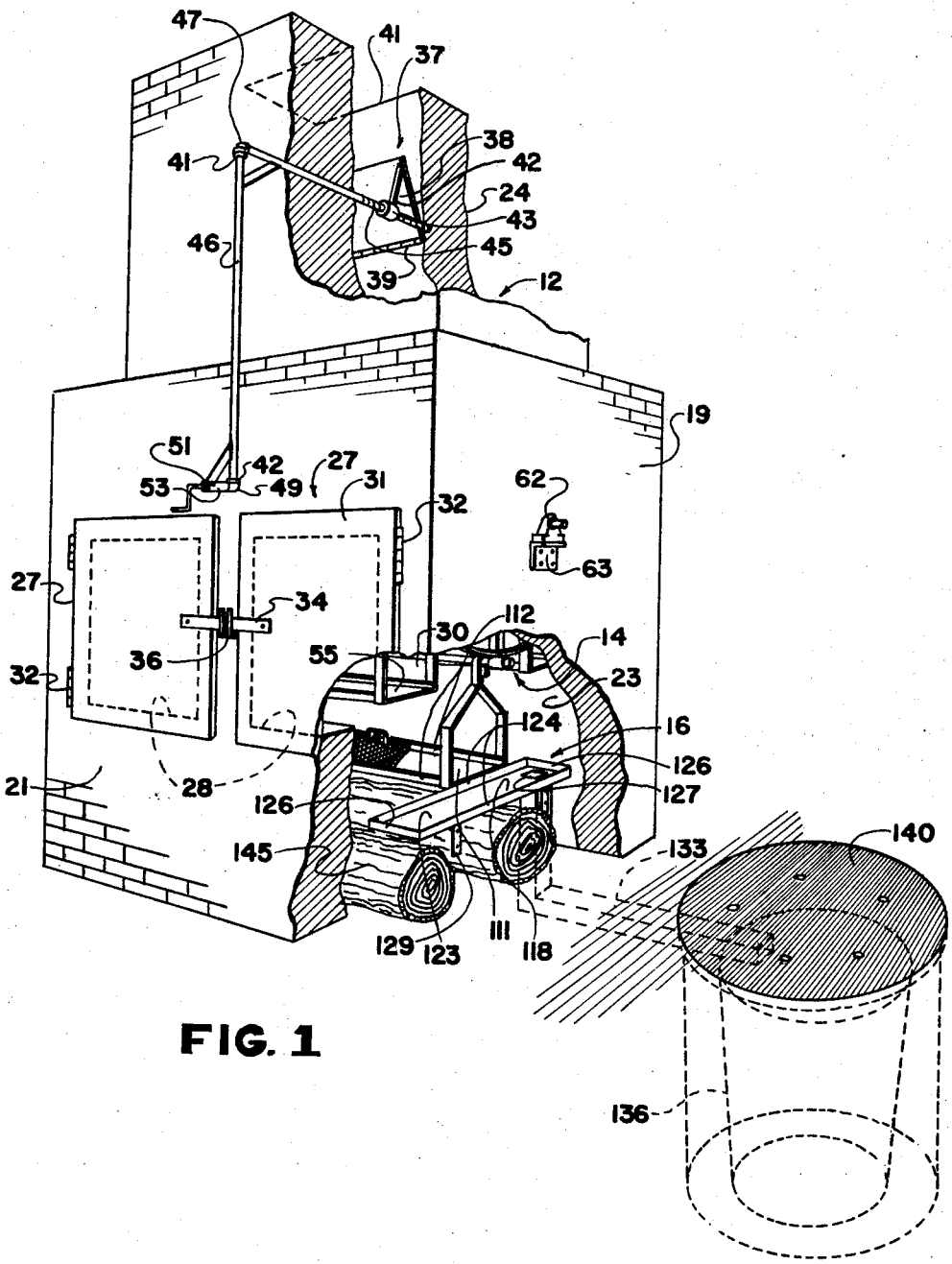
FIG. 1 is a perspective view of a cooking oven having portions thereof broken away to reveal a product and waste disposal carrier of this invention.

Referring to the drawings in detail, and in particular to FIG. 1, a barbecue type cooking oven 12 is illustrated as having the cooking apparatus of this invention mounted therein. The cooking apparatus includes a rotatable product carrier 14 operably associated with a collecting means 16 in a manner to be described.

As seen in FIG. 1, the cooking oven 12 is provided with sidewalls 17 and 19; a front wall 21; a back wall 23; and an upright chimney section 24 of generally square shape in transverse cross-section. The front wall 21 is provided with a pair of access door assemblies 27 operable to provide entry through enlarged opening 28 to the interior of the oven which is called the cooking area 30. Each access door assembly 27 is provided with a rectangular closure plate 31 connected to the front wall 21 as by hinges 32 and having a pivotal latch bar 34 attachable to a yoke plate 36 to lock the door assembly 27 in a closed position. Mounted within the upper chimney section 24 is a venting means 37 including an enlarged baffle plate 38 connected as by hinges 39 to one side defining a discharge opening 41 and having one end of an actuator arm 42 pivotally connected thereto. The opposite end of the actuator arm 42 is secured to a worm-type cylinder 43 mounted about a threaded shaft 45 so that the baffle plate 38 is pivoted about the hinges 39 on axial movement of the cylinder 43 along the shaft 45. The venting means 37 includes bevel gears 41 and 42 provided on opposite ends of an intermediate shaft 46 which is connected to a bevel gear 47 on the shaft 45 at one end and at the other end to a similar gear 49 on an actuator crank 51. The actuator crank 51 is mounted within a housing 53 and rotatable for movement of the shafts 45 and 46 through the bevel gears 41, 42, 47, and 49 in a conventional manner. It is seen, therefore, that the actuator crank 51 is operable to open and close the baffle plate 38 in order to maintain the desired draft and resultant heat and smoke conditions within the cooking area 30. The oven 12 is provided with a burner assembly 52 preferably of a gas type, operable to ignite charcoal or logs therein.

As shown in FIGS. 2 and 3, the product carrier 14 is provided with a main support frame assembly 54 having a plurality of basket assemblies 55 pivotally connected thereto and movable about a common drive shaft 57 which is rotated by a power means 58. The drive shaft 57 is extended through horizontally aligned openings 60 in the sidewalls 17 and 19 and rotatably carried within bearing assemblies 62 mounted on brackets 63 secured to the exterior of the sidewalls 17 and 19. One end of the drive shaft 57 is connected to the power means 58 having an electrical motor 65 mounted upon a shelf 67 on the sidewall 17 connected to the shaft 57 by a gear and belt drive 68. An on-off switch 71 mounted on the exterior side of the sidewall 17 is connected as by electrical conduit to the motor 65 in order to power the drive shaft 57 as required. It is obvious that various speeds can be obtained in driving the support frame assembly 54 depending upon the gear ratio and size of the pulley members to be used. The power means 58 is additionally provided with an outer housing cover 73 to make the same attractive in appearance.

The frame assembly 54 is provided with upright opposed end support hub assemblies 74 and 76, each connected to the drive shact 57 for rotation about a horizontal axis and interconnected by a plurality of circumferentially spaced support bars 77. As the support hub assemblies 74 and 76 are substantially identical, only one need be described in detail. The support hub assembly 74 is provided with two semi-circular half sections 79 interconnected as by bolt members 82 through attached adjacent brackets 84 and having a plurality of readily extended support spokes 86 connected at the outer ends to ring members 88. Each of the semi-circular half sections 79 are provided with a semi-circular notch 89 adapted to receive the drive shaft 57 therein in the assembled condition (FIG. 6). The radially extending spokes 86 are preferably of an angle iron construction having the outer end thereof secured as by welding to the ring members 88 and having cylindrical connectors 91 welded thereto adapted to receive respective ones of the support bars 77 therethrough. The adjacent end portions of the respective ring members 88 are interconnected as by overlapping arcuate plates 92 bolted thereto. In the assembled conditions, it is seen that the drive shaft 57 is secured to the respective hub assemblies 74 and 76 as by bolt or drive pins 95 mounted through aligned openings therein and the outer connectors 91 on each hub section are aligned and the support bars 77 mounted therethrough. The opposite ends of the support bars 77 are provided with diametrically extended openings adapted to receive lock pins 96 therein on opposite sides of the connectors 91 as shown in FIG. 5 to connect the bars 77 thereto. Additionally, washer members 98 are provided to insure proper pivotal movement of the various elements during usage as will be explained.

The basket assemblies 55 are each provided with facing hanger assemblies 101 connected to a removable liquid collecting tray 103 having a product basket 105 mounted therein. The hanger assemblies 101 include upper hook sections 106 having downwardly diverging support legs 108 secured thereto. The lower ends of the support legs 108 of associated ones of hanger assemblies 101 are secured as by welding to angle iron members 109 extended from one to the other. It is seen that each basket assembly 55 is provided with two of the hanger assemblies 101 of substantially identical configuration but of different sizes whereupon the liquid retaining tray 103, when mounted upon the angle iron members 109, is extended in a downwardly inclined manner for reasons to become obvious. The collecting tray 103 includes a main body plate 111 having upright sidewalls 112 and an upright endwall positioned at the elevated end thereof so that liquid falling thereon is directed by the same towards the lower most end of the respective basket assembly 55. In other words, the tray 103 is a trough-like structure adapted to convey fluids in a downward direction towards the sidewall 19 of the cooking oven 12. The product basket 105 is of a similar size and shape as the tray 103 except of a grate-type construction having a main support section and opposite side sections provided with spaced upright U-shaped handles 115 so as to be easily removed from the hanger assemblies 101 as required. It is seen that each of the hanger assemblies 101 is provided with two of the baskets 105 to make the same easily removable.

As shown in FIGS. 2 and 3, the collecting means includes a collecting tray 118 interconnected as by a conduit 120 to a remote receiving reservoir 121. More specifically, the collecting tray 118 is of a generally pan shape including a main body 123 with upright sidewalls 124 and endwalls 126 having an enlarged rectangular opening 127 at one end connected to the conduit 120. The collecting tray 118 is mounted as by bracket members 129 to the inner surface of sidewall 19 so as to be inclined downwardly (indicated at A) towards the end having the opening 127 so that liquid flows towards the lower-most end for discharge into the conduit 120. In turn, the conduit 120 has a vertical leg 131 integral with an inclined leg 133 to the receiving reservoir 121 which is provided with upright enlarged barrel 136 adapted to receive the liquid into the open end thereof. Preferably, the barrel 136 is placed within a cylindrical cavity a substantial distance from the cooking oven 12 so as to provide safety features in fire prevention as the liquid can be highly inflammable. A cover plate 140 is provided to close the cavity having a plurality of air holes for ventilating purposes.

In the use and operation of the applicant's cooking apparatus, it is seen that the oven 12 is provided with a plurality of hickory logs 145 or the like placed adjacent the burner assembly 52. The baffle plate 38 is opened by the actuator crank 51 in order to provide sufficient oxygen and ventilation therein. Next, the burner assembly 52 is turned to the on position whereupon the gas emitting therefrom is ignited in a conventional manner. The baskets 105 are readily removable from the trays 103 whereupon meat products such as roasts, hams, and the like are placed therein in order to be cooked and smoked within the oven 12. After the logs 145 have been ignited so as to provide sufficient heat into the cooking oven 12, the burner assembly 52 may be turned to the off position and the baffle plate 38 is regulated as desired in order to retain the heat and smoke within the oven area 30. With the basket assemblies 55 loaded with the food products, the power means 58 is actuated as by turning on the switch 71 whereupon the drive shaft 57 is rotated to oscillate the basket assemblies 55 from adjacent to remote positions relative to the hickory logs 145. This results in each of the basket assemblies 55 being provided with substantially equal amounts of heat and smoke so that the cooking process is simplified without having to worry about localized hot and cold spots within the cooking oven 12.

As in all barbecuing type operations, it is obvious that juices from the meat product will drip therefrom on becoming heated and will fall into the trays 103 of the basket assemblies 55. Due to the downward inclination thereof as shown in FIG. 3, it is obvious that the heated fluid runs downwardly into the collecting tray 118 as the discharge ends of the liquid trays 103 extend over the adjacent sidewall 124 of the collecting tray 118. Additionally, due to the inclination of the collecting tray 118, it is obvious that the heated juices therein will run into the conduit 120 and on to the remote receiving reservoir 121. It is seen that this liquid conveyance system of the cooking apparatus of this invention operates in a new and novel manner to maintain the oven in a clean condition plus provides numerous safety features in quickly removing the inflammable liquids therefrom.

It is noted that the rotatable product carrier of this invention is constructed of the two hub sections connected to the support bars in a manner so as to be readily assembled and disassembled. This feature of segmented construction permits the same to be mounted within existing cooking ovens as desired.

As will be apparent in the foregoing description of the applicant's new and novel cooking apparatus, relatively inexpensive means are provided mountable within conventional cooking ovens in order to achieve rotation of the meat product being cooked so as to receive a substantially constant amount of heat and smoke relative to the time subjected thereto. The cooking apparatus is generally inexpensive to manufacture, simple to use, provided with numerous safety features, and results, additionally, in a relatively clean oven condition for health and safety reasons.

What is claimed is:

1. A product and waste disposal apparatus adapted for use in a cooking means having side members; a discharge; and means to provide heat for cooking processes, comprising:
   (a) a product carrier means including a support frame assembly connected to a drive shaft which is rotatably mounted in the side members of the oven, a plurality of basket assemblies connected to said frame assembly, and means connected to said drive shaft for rotation thereof;
   (b) said frame assembly having a plurality of spaced, horizontally extended support bars each adapted to receive one of said basket assemblies thereon for rotation about said drive shaft;
   (c) said basket assemblies connected to said support bars in a downwardly depending manner and extending substantially the full length of the support bars and inclined downwardly towards one of the side members; and
   (d) collecting means having a receiving member extended laterally the lower-most end portion of said basket assemblies to receive liquid therefrom for conveyance externally of the cooking oven.

2. An apparatus as described in claim 1, wherein:
   (a) said frame assembly including first and second interconnected hub sections mounted on said drive shaft having an outer ring member connected to said support bars; and
   (b) said hub sections extended and rotatable in separate, parallel vertical planes on rotation thereof by said drive shaft.

3. An apparatus as described in claim 2, wherein:
   (a) said basket assemblies having upright hanger assemblies having the upper ends thereof pivotally connected to respective ones of said support bars and tray members extending substantially the full length of said support bars and connected to said hanger assemblies so as to maintain said tray members extended in constant inclined planes regardless of the rotational position of said basket assemblies about said drive shaft.

4. An apparatus as described in claim 1, wherein:
   (a) said basket assemblies having hanger frame assemblies provided with spaced hook members mounted upon said support bars and lower inclined tray members thereon extended substantially the entire length of said support bars;
   (b) basket members releasably mounted within said tray members operable to carry products to be cooked thereon for easy addition and removal from the oven; and
   (c) said tray members inclined downwardly towards said one of the sidewalls for flow of fluids thereon to said collecting means.

5. An apparatus described in claim 1, wherein:
   (a) said collecting means including a conduit connected to a lower end of said receiving member to convey liquids to a remotely located storage reservoir whereby the inflammable type liquids from within the cooking oven are transferred to the remote location for safety purposes.

References Cited
UNITED STATES PATENTS

| 2,533,080 | 12/1950 | Alexander. | |
| 2,685,285 | 8/1954 | Bergeron | 126—25 |
| 3,344,737 | 10/1967 | Sanders | 99—446 |

WALTER A. SCHEEL, Primary Examiner

A. O. HENDERSON, Assistant Examiner

U.S. Cl. X.R.

99—446; 126—25